Jan. 7, 1930.  F. M. REID  1,742,413
POLE TRAILER
Filed Feb. 11, 1927
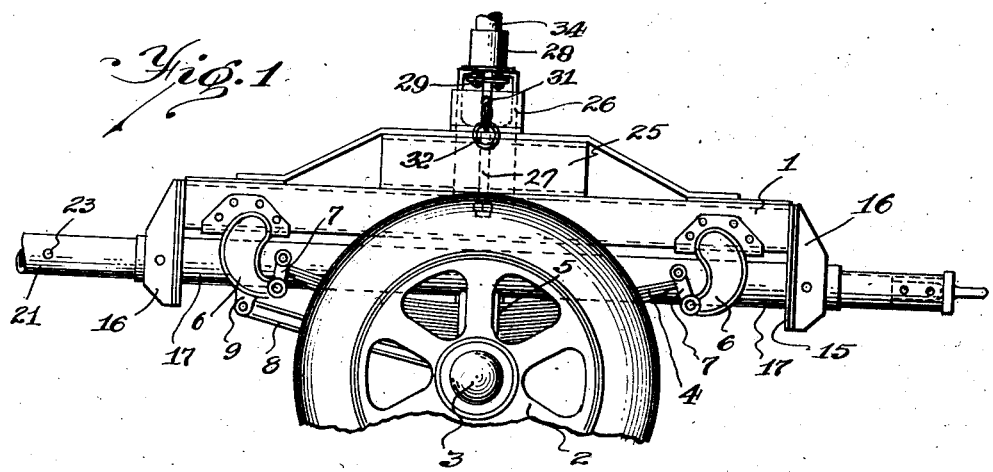
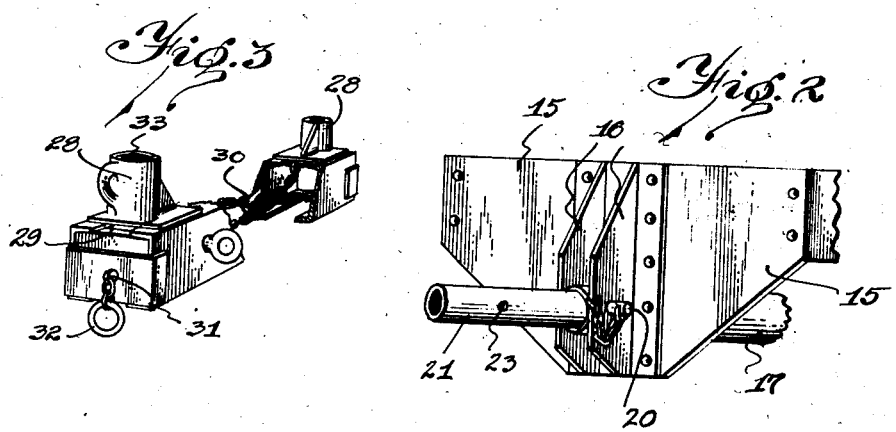
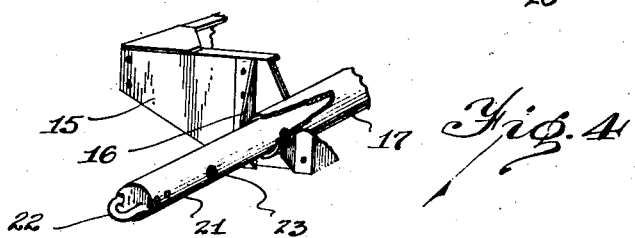
Inventor
Frederick M. Reid
By Stuart C. Barnes
Attorney Patented Jan. 7, 1930

1,742,413

UNITED STATES PATENT OFFICE

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN

POLE TRAILER

Application filed February 11, 1927. Serial No. 167,384.

This invention has to do with a pole trailer, which is one which consists of a single pair of wheels having a frame construction and a reach for connecting it to a tractor.

The pole trailer of this invention embodies a connection between the trailer and the reach which permits of quick and easy adjustment, or which permits removal of the reach entirely from the trailer. The reach is connected to the trailer so that the front and rear ends of the trailer are securely held in alignment with the reach, thus eliminating snaking, or side to side movement of the trailer, and at the same time eliminating twisting strains on the reach. The pole trailer is provided with a bolster for supporting the load, and upon this bolster are blocks which are adjustable transversely of the bolster to fit particular loads. In addition to being adjustable the blocks may be removed from the upper surface of the bolster, but at the same time they can not be entirely detached from the trailer so that they are not liable to be lost when they are not used for a load.

In the accompanying drawings:

Fig. 1 is a side elevation of the pole trailer.

Fig. 2 is a perspective view of one end of the trailer frame.

Fig. 3 is a detail showing the bolster and block construction.

Fig. 4 is a perspective view with parts cut away showing the manner in which the reach is connected to the frame.

The trailer has a frame 1 which is supported by a running gear including wheels 2 carried by an axle 3. A spring 4 connects each side of the frame with the axle, the spring being clamped to the axle as by means of U-bolts 5, and the frame being provided with brackets 6 supporting pivoted shackles 7 which pivotally carry the ends of the springs. The frame and axle are held rigid with respect to each other by a radius rod 8 which may be connected to the axle by the U-bolts 5, and one bracket on each side of the frame is provided with a depending portion 9 for pivotally holding one end of the radius rod.

Each end of the frame is provided with a plate-like member 15. This plate-like member in reality constitutes the end member of the frame and it depends downwardly from the frame and is provided with outwardly extending flanges 16 formed by angle irons bolted or riveted thereto.

Extending longitudinally of the trailer, and connected at each end with the end pieces 16, is a tubular member 17. As shown in Fig. 4 the end of this tubular member lies between the flanges 16. Both flanges, and this tubular member, on each side of the frame, are provided with aligned openings and a pin 20 is adapted to extend through these openings. Preferably the pin is fixed to the trailer by means of a chain so that the same may not be lost.

A reach 21, having a link 22 for attachment to a truck, is adapted to slide within the tubular member 17, the tubular member being slightly larger than the reach. This reach is preferably in the form of a tube or pipe and is provided with a series of holes 23. The reach is readily adjustable for length by selectively placing the pins 20 through the aligned openings in the members on the frame, and in the reach. The openings in the reach are such that they align for the reception of the pins at both ends of the frame so that in use both pins 20 serve to hold the reach in place.

The frame carries the super-structure 25, and upon this super-structure is pivotally secured a bolster 26. The bolster is secured to the frame by means of a king bolt 27.

By reference to Fig. 3 it will be noted that the bolster is made up of channel irons. Wedge blocks 28 are slidably carried on the bolster and are provided with members 29 which underlie the angle members of the bolster. Each wedge block is provided with a chain 30 which extends across the bolster and is threaded through a key-hole slot 31 in the end of the bolster. By this construction the wedge blocks can be adjusted along the bolster for holding a load and when the desired adjustment is reached one of the links in the chain is dropped down into the narrow portion of the key-hole opening and the block is held against outward movement.

It will be noted that the wedge blocks can be removed by sliding the same off the end of the bolster and the chains are sufficiently long to permit this. However, the wedge blocks can not be entirely detached inasmuch as the end link 32 of each chain is large and will not pass through the opening in the end of the bolster. This is advantageous because sometimes a load is to be carried wherein wedge blocks are not needed and they can be readily removed without danger of being lost. The wedge blocks are preferably hollow, as shown at 33, for receiving uprights, as shown at 34.

It will be seen that the invention provides a rugged pole trailer which does not involve mechanism liable to get out of order. The reach and the trailer body are securely held together at the forward and rear ends of the trailer body, and also the reach can be quickly and easily adjusted with respect to the trailer body or it may be removed entirely. The chains secured to the wedge blocks, take the load when the wedge blocks are pushed outwardly, and the arrangement of the chains and the key-hole slots permit adjustment of the wedge blocks, or their removal from the bolster, yet preventing complete detachment from the trailer.

I have called the blocks 28 wedge blocks in the description and in some of the claims. However, I desire it understood that the claims are not limited to blocks that have a wedge action on the load. Obviously the blocks have the broad function of laterally supporting the load whether wedging or not and can be used as chocks or stake holders.

Claims:

1. In a pole trailer, the combination of a frame, a tubular member extending lengthwise of the frame with the ends thereof projecting through the end members of the frame, reinforcing members on each end of the frame and embracing opposite sides of the said tubular member, a reach of slightly less diameter than the tubular member and adapted to be slidably received in said tubular member, said reinforcing means and said tubular member having aligned openings, and said reach having openings adapted to align with the openings in the tubular member and reinforcing member, and pins for insertion through the aligned openings for locking the reach within the tubular member.

2. In a pole trailer, the combination of a frame, an axle, and springs for supporting the frame a material distance above the axle, the end members of the frame extending downwardly from the frame generally, a tubular member mounted underneath the frame and extending from the forward to the rear of the frame in the space between the axle and said frame and supported by the said end members of the frame, said tubular member being adapted to adjustably receive and hold a reach for the pole trailer, said tubular member being carried sufficiently above the axle, by reason of the distance between the axle and frame so as not to interfere with the axle upon flexing of the springs incident to use of the trailer.

3. In a bolster construction for vehicles, a pair of channel members positioned transversely of a vehicle and substantially parallel with each other and with the bottom of the channels positioned vertically to provide a bolster, a pair of chock blocks slidably carried by said bolster, said chock blocks resting upon horizontal legs of the channel members, means secured to the chock blocks and underlying said horizontal legs to retain the blocks upon the bolster, a pair of chains each connected to a chock block and extending transversely across the vehicle in crossed relation, and means secured to each end of the bolster and provided with an aperture through which the respective chains pass, said apertures being substantially in the shape of a key-hole to permit of adjustment and locking of the chains to hold the chock blocks in adjusted position.

In testimony whereof I affix my signature.

FREDERICK MALCOLM REID.